Figure 1:
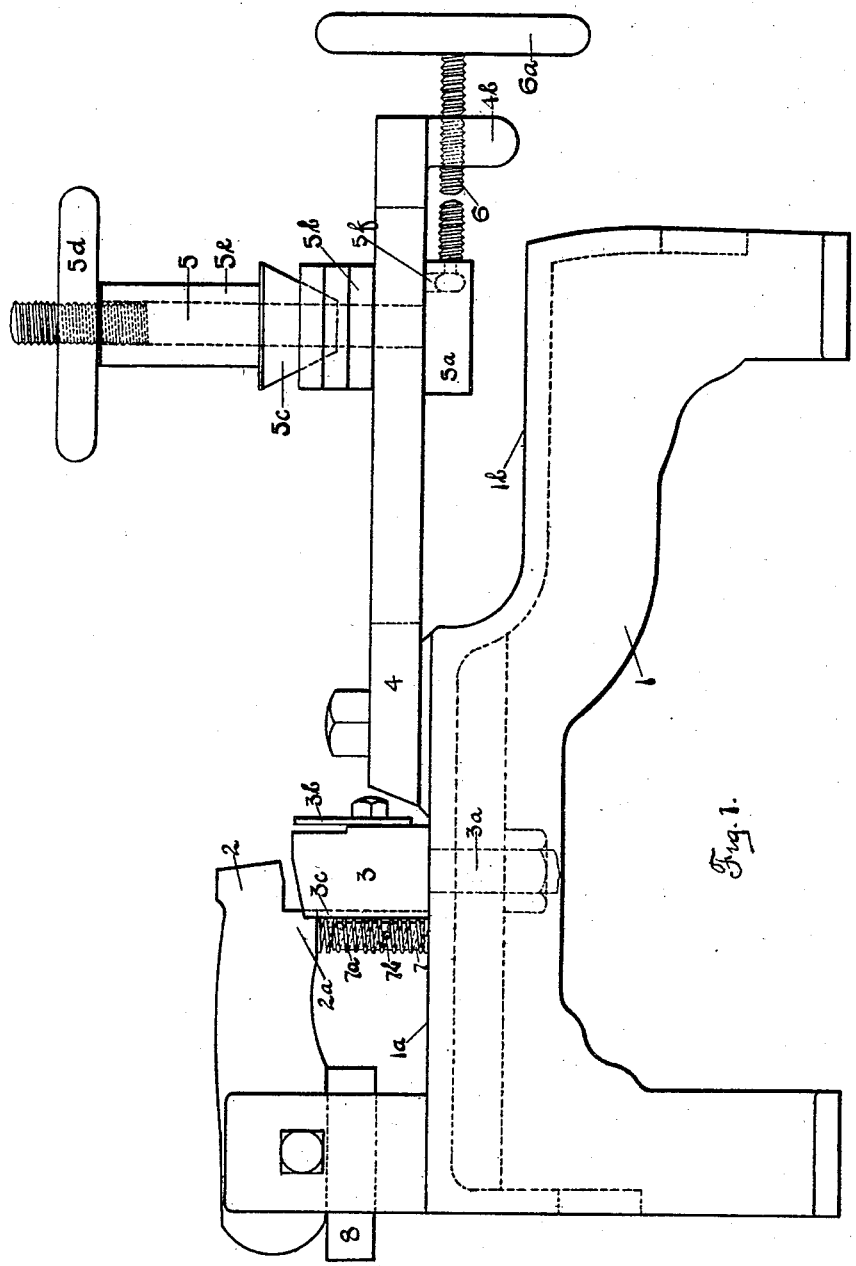

No. 633,725. Patented Sept. 26, 1899.
M. P. MAHAR.
SAW SETTING AND JOINTING MACHINE.
(Application filed Feb. 4, 1899.)
(No Model.) 2 Sheets—Sheet 1.

Witnesses
Ray Fzalick
David L. Favour

Inventor
Malicha P. Mahar
By his Attorney
George B. Willcox

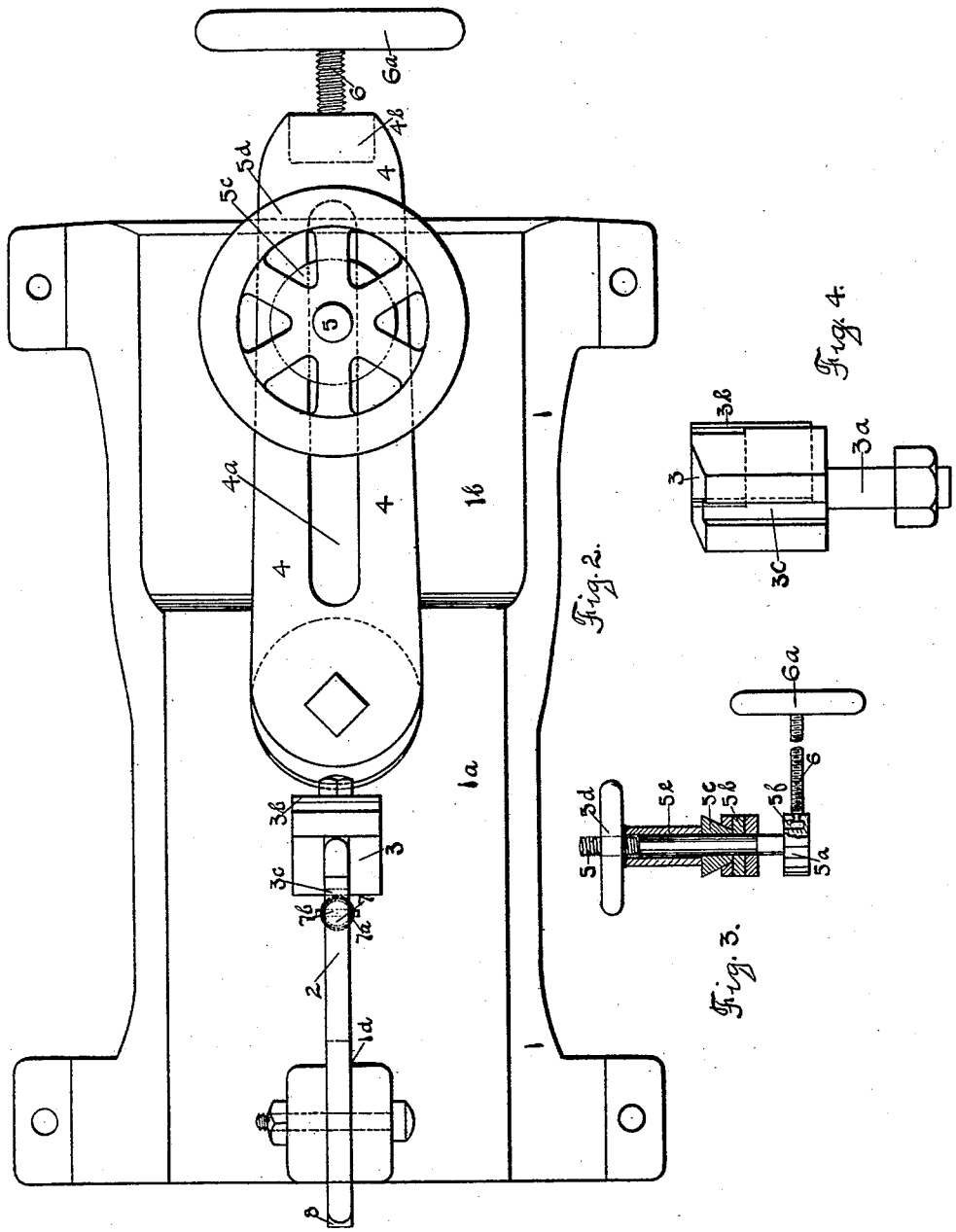

UNITED STATES PATENT OFFICE.

MALICHA P. MAHAR, OF WEST BAY CITY, MICHIGAN.

SAW SETTING AND JOINTING MACHINE.

SPECIFICATION forming part of Letters Patent No. 633,725, dated September 26, 1899.

Application filed February 4, 1899. Serial No. 704,593. (No model.)

*To all whom it may concern:*

Be it known that I, MALICHA P. MAHAR, a citizen of the United States, residing at West Bay City, in the county of Bay and State of Michigan, have invented certain new and useful Improvements in Saw Setting and Jointing Machines; and I do hereby declare the following to be a full, clear, and exact description of the invention, such as will enable others skilled in the art to which it appertains to make and use the same.

My invention relates to machines for setting and jointing saws, and more particularly to that class of saw-setting machines in which a fixed anvil operates in conjunction with a movable die to set the teeth of the saw and a movable arm supports the saw at its center and adjusts the saw relatively to the die and anvil.

The improvement consists in certain constructions and combinations of the parts of the machine whereby the purposes of my invention are accomplished.

The objects of the invention are, first, to provide means whereby the centering device may be raised or lowered to suit saws either with or without collars and bring the saw to the same horizontal plane as the top of the anvil; second, to provide means for easily and quickly adjusting the saw relatively to the anvil; third, to provide a die or striker that will not obstruct the view of the operator and that can readily be removed and replaced when desired; fourth, to so cushion the striker as to insure its immediate return to the raised position without vibration after the blow is struck; fifth, to provide means whereby a jointing-file may be readily secured to the front of the anvil and removed therefrom without the use of screws or special devices for securing it in position, and, sixth, to produce as an improved article of manufacture an adjustable saw setting and jointing machine that has few working parts, is simple in construction and operation, and not liable to get out of order.

My invention is shown in the accompanying drawings, throughout the several views of which similar figures of reference designate similar parts and devices.

Figure 1 is a side view of the complete machine. Fig. 2 is a top view of the same. Fig. 3 is a detail of the centering device, showing the means for its horizontal adjustment. Fig. 4 is a perspective view of the anvil-block with the file-holding attachment.

As is plainly shown in the drawings, the device consists of a base 1, having its top stepped to form an upper surface or table $1^a$, which carries the working parts of the machine, and a lower surface $1^b$, which admits of the free passage of the centering device over it. Cast in one piece with the part $1^a$ and projecting above it is a lug having a vertical slot $1^d$ and a hole for the passage of a bolt or pivot by which the die-arm is supported. An anvil 3 is clamped to the base $1^a$ by a bolt $3^a$. In front of the anvil 3 is pivoted a slotted arm 4, adapted to swing in a horizontal plane. The arm 4 carries at its outer end the saw-centering device, which consists of a vertical bolt 5, threaded throughout its upper portion and having an enlarged head $5^a$. The part of the bolt between the head and the beginning of the thread is flattened on two sides to permit the bolt to slide along the slot $4^a$ and to prevent its turning. A number of washers $5^b$ of varying thicknesses are placed on the bolt above the arm 4. The top washer has a conical recess in which fits a cone-shaped washer $5^c$, which enters the arbor-hole of the saw and holds the saw-disk central. A hand-wheel with its hub threaded and a cylindrical washer $5^e$ serve to press the cone to its seat. A T-slot $5^f$, extending from the upper side of the bolt-head partly throughout the same, admits the T-head of a horizontal adjusting-screw 6, which engages an internally-threaded lug $4^b$, projecting downward from the arm 4. A hand-wheel $6^a$ operates the screw 6.

The saw is centered by being placed between the top washer and the cone $5^c$ and is clamped in place by means of the hand-wheel $5^d$. When saws having hubs of various thicknesses are to be set, the height of the saw may be adjusted by varying the number of washers $5^b$ so as to bring the saw on the same horizontal plane as the top of the anvil.

The anvil 3 consists of a rectangular block having a bolt forged at its bottom for clamping the anvil to the base $1^a$. The part of the anvil on which the saw-tooth rests is horizontal, but the part under the point of the tooth is beveled to correspond with the set which it is desired to give the saw.

The striker or die of the arm is beveled to correspond with the face of the anvil, as is plainly shown in the drawings in Fig. 1. The vertical face of the anvil nearest the saw is cut away from the top downward to form a horizontal recess in which a jointing-file may be placed.

A flat spring or clip $3^b$ is secured to the anvil by a bolt, brazing, or otherwise and retains the jointing-file in position. A vertical slot $3^c$ is provided at the back of the anvil 3.

The downwardly-projecting lug $2^a$ of the arm 2 fits in the slot and guides the die. The part of the arm 2 above the die is flattened to receive the blow of the hammer used in setting the teeth of the saw. A vertical pin 7, secured to the base $1^a$ at the back of the anvil, carries a coil-spring $7^a$, which returns the arm 2 to its original position. The horizontal pin $7^b$ passes through the pin 7, and its projecting ends engage the coils of the spring $7^a$. By screwing or unscrewing the spring $7^a$ more or less of the spring will be retained below the pin $7^b$, thus regulating the pressure of the spring $7^a$ on the arm 2. To prevent vibration of the arm 2 after the blow has been struck, a cushion of elastic material 8, such as rubber, is inserted in the slot $1^d$ below the arm 2.

By means of the horizontal screw adjustment above described I am enabled to adjust the saw to the anvil quickly and with great accuracy and by means of the washers $5^b$ to adapt the device to suit a saw with or without a hub and to bring the saw into the same horizontal plane as the top of the anvil.

By means of the spring-clip $3^b$ a jointing-file may be quickly attached to the anvil without the use of screws or bolts. The slot $3^c$ at the back of the anvil keeps the die in line and guides the arm 2, while the spring $7^a$ and the elastic cushion 8 prevent jar or vibration of the arm 2.

What I claim as my invention, and desire to secure by Letters Patent, is—

In a saw setting and jointing machine having a base, an anvil mounted thereon and a horizontal swinging arm pivoted thereto; the combination of a saw-centering device consisting of a vertical bolt mounted on said arm, a horizontal screw for adjusting said bolt lengthwise of the arm and washers mounted on the bolt; with a saw-setting device consisting of a vertically-movable arm pivoted at one end to the base and having a striking-die at the other end with a projecting portion below the die, a vertical slot in the anvil adapted to receive said projecting portion; a cushion of elastic material interposed between the pivot of the arm and the base, and a compressible spring near the die end of the arm for raising it, substantially as described and for the purpose set forth.

In testimony whereof I affix my signature in presence of two witnesses.

MALICHA P. MAHAR.

Witnesses:
S. RAY FRALICK,
DAVID LE FAVOUR.